United States Patent [19]

Smith et al.

[11] 4,105,177
[45] Aug. 8, 1978

[54] BREAKAWAY LINK ASSEMBLY FOR MAINTAINING A STRUCTURAL ALIGNMENT OF SHOCK-SENSITIVE EQUIPMENT

[75] Inventors: William R. Smith, Godfrey, Ill.; Robert H. Duchild, Chesterfield, Mo.

[73] Assignee: The United States of America as represented by the Secretary of the Navy, Washington, D.C.

[21] Appl. No.: 833,121

[22] Filed: Sep. 14, 1977

[51] Int. Cl.² ............................................. F16F 15/00
[52] U.S. Cl. ....................................................... 248/15
[58] Field of Search ........................ 248/15, 18, 20, 21, 248/22, 358 R, 475 B, 478; 52/167

[56] References Cited
U.S. PATENT DOCUMENTS

| 1,716,484 | 6/1929 | Carrey | 248/20 X |
|---|---|---|---|
| 2,365,842 | 12/1944 | Rosensweig | 248/20 |
| 2,425,567 | 8/1947 | Robinson | 248/22 X |
| 2,936,978 | 5/1960 | Lauck | 248/18 X |
| 3,474,992 | 10/1969 | Schuck et al. | 248/21 X |
| 3,592,422 | 7/1971 | Paine | 248/18 |
| 3,730,474 | 5/1973 | Bowers | 248/475 B |

Primary Examiner—William H. Schultz

Attorney, Agent, or Firm—Richard S. Sciascia; Paul N. Critchlow

[57] ABSTRACT

The reliability of electronic navigational equipment, such as missile guidance sets, frequently requires a precisely-aligned support or mounting which must be rigidly maintained during the missile operation or flight. To maintain the alignment, the housing for the electronics is rigidly supported by a link mechanism pivotally coupled at one end to the missile airframe and, at the other, to the electronic housing through a crosshead assembly which includes a crosshead block slidably mounted in dove-tailed tracks of a crosshead guide carried by the housing. A spring-urged plunger of the crosshead assembly has its ends engaged in steep-walled detents to normally, during flight, lock the block in a fixed position. Extreme, non-operational, acceleration forces such as otherwise would damage the electronics, overcome the spring force on the plunger permitting a slidable breakaway displacement. Resilient shock absorbers then protectively cushion the force. The absorbers also function to subsequently return the block to its locked position and realign the structure. The detent profile includes a shallow-angle peripheral ramp to facilitate realignmemt.

13 Claims, 9 Drawing Figures

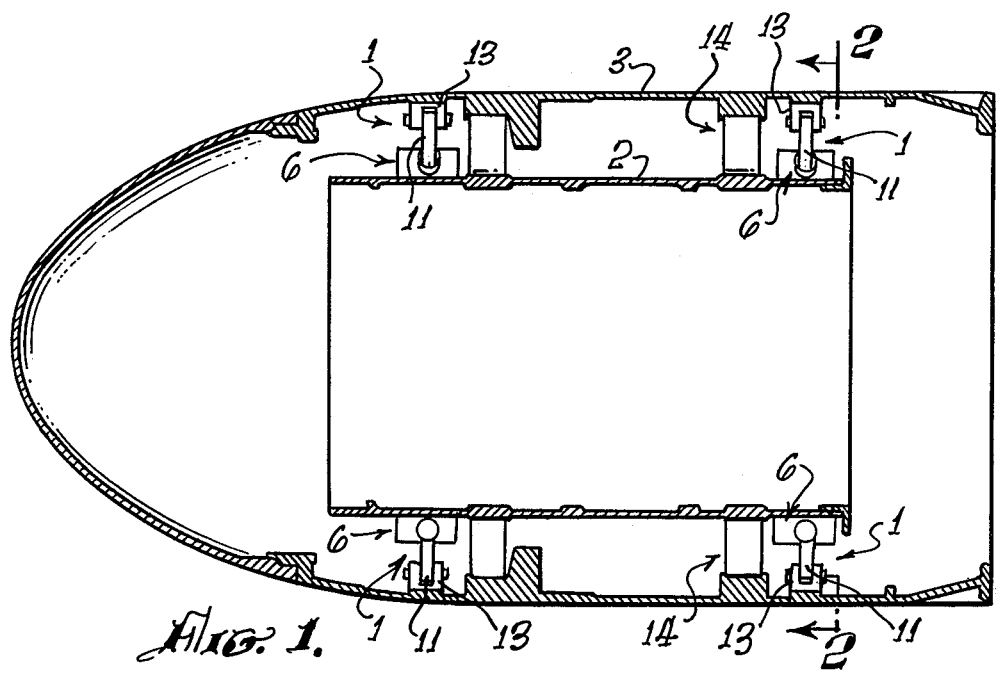
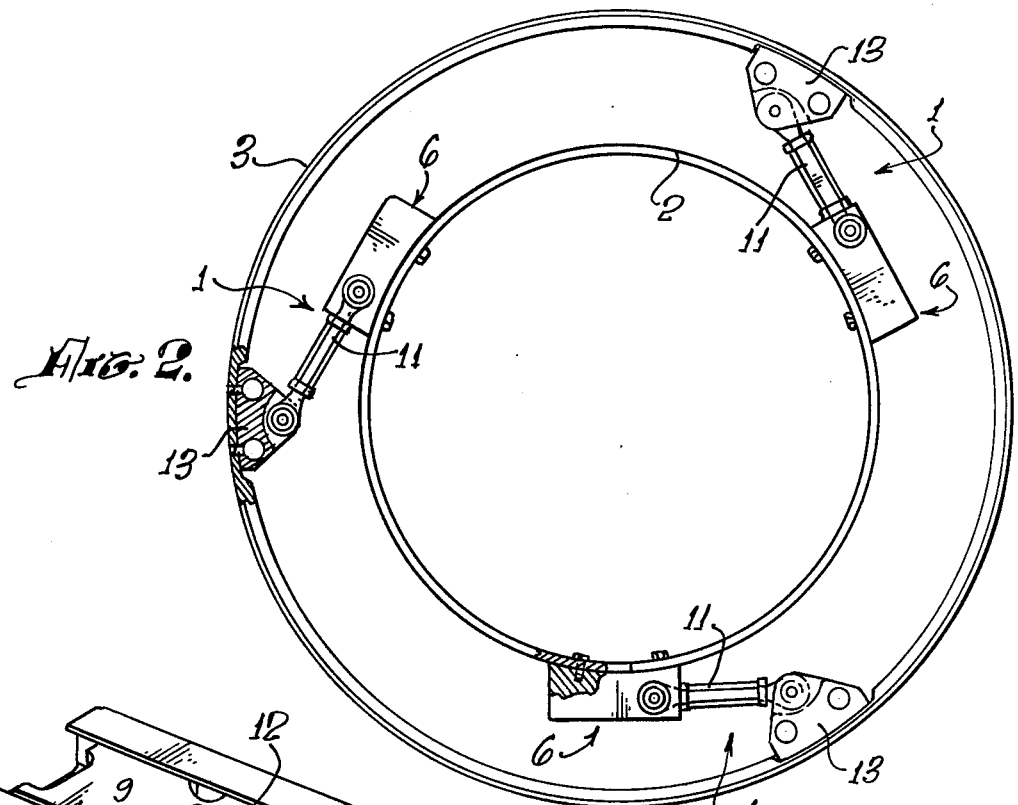
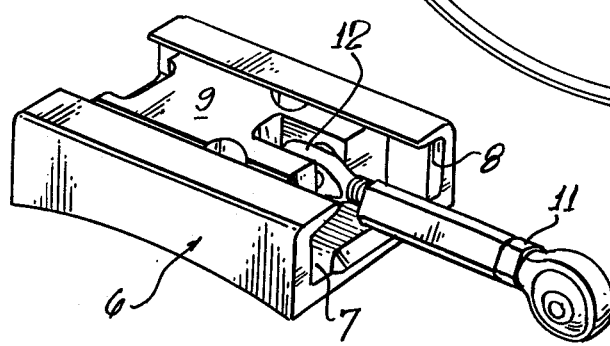

BREAKAWAY LINK ASSEMBLY FOR MAINTAINING A STRUCTURAL ALIGNMENT OF SHOCK-SENSITIVE EQUIPMENT

BACKGROUND OF THE INVENTION

The invention relates to breakaway link assemblies for supporting shock-sensitive equipment in aligned dispositions.

Electronic equipment of the type used for missile guidance conventionally is carried by a support housing or shell which, in turn, is mounted in an airframe structural shell. To assure operational reliability and precision, the housing of the electronic components must be very precisely aligned with the airframe. Further, the alignment must be maintained during flight in which, of course, the missile is subjected to substantial vibratory disturbances as well as the forces of in-flight maneuvers. For present purposes, these in-flight acceleration forces are considered as being 'normal operational conditions' which, by way of illustration, usually are substantially less than 10g.

Aside from these normal operating conditions, the protection and alignment-maintenance also must consider non-operational g-load factors. For example, the missiles require handling, transportation and storage all of which may impose load factors of a relatively low level such as 10–15g. However, in these handling phases, absolute rigidity does not have to be constantly maintained and some slight movements can be tolerated providing the support is such that realignment occurs automatically when the disturbance is removed. In other words, these relatively-low level, non-operational accelerations usually are not damaging to the shock sensitive equipment and they can be applied directly provided realignment is achieved prior to flight.

At force levels higher than those anticipated during flight or normal handling and transportation, the support problem becomes primarily one of protection rather than alignment. For example, 'Missile Guidance Set' of the so-called Cruise missile probably can withstand 'g' forces up to about 50g before actual damage occurs. However, when stored in a submarine, extreme load forces from 'near misses' or the like must be anticipated. Such forces may be in the order of 200g which obviously would cause serious damage.

Consequently, the type of link mechanisms presently being considered are characterized by their ability, first, to provide the requisite rigid support under normal operating conditions and, next, to provide a breakaway capability when exposed to higher non-operational forces. It is recognized that there are a number of comparable devices capable of withstanding normal forces and also capable of breaking or yielding at a predetermined force level. Such mechanisms, however, although perhaps quite beneficial in their particular applications, do not appear to fulfill the present requirements. For example, rigidity or stiffness under operational conditions apparently has not been a controlling consideration. Also, these mechanisms apparently have not considered the need for a controlled yielding of the rigidity followed by an automatic realignment. Finally, from a functional viewpoint, although breakaway may be achieved, the arrangements do not easily and automatically accomplish a subsequent realignment which is essential for operational reliability.

The objects of the present invention should, for the most part, be apparent in the foregoing description. However, a further important object is one of providing a rigid, breakaway supporting and aligning link mechanism which is extermely small relative to its load capability. For example, in the Cruise missile, the isolation system 'sway' space provided for the breakaway link is less than 2". With such a space limitation, springs or the like, such as frequently are used for the breakaway loading, must have very high spring rates for very short strokes. As far as is known, breakaway links of the type presently contemplated have not been adapted for such confined use.

BRIEF DESCRIPTION OF THE DRAWINGS

The invention is illustrated in the accompanying drawings of which:

FIG. 1 is a somewhat schematic view showing an electronic equipment shell supported within an airframe shell of a missile;

FIG. 2 is a section through lines 2—2 of FIG. 1;

FIG. 3 is a perspective view of the present link assembly;

DETAILED DESCRIPTION OF THE INVENTION

Figure 4:
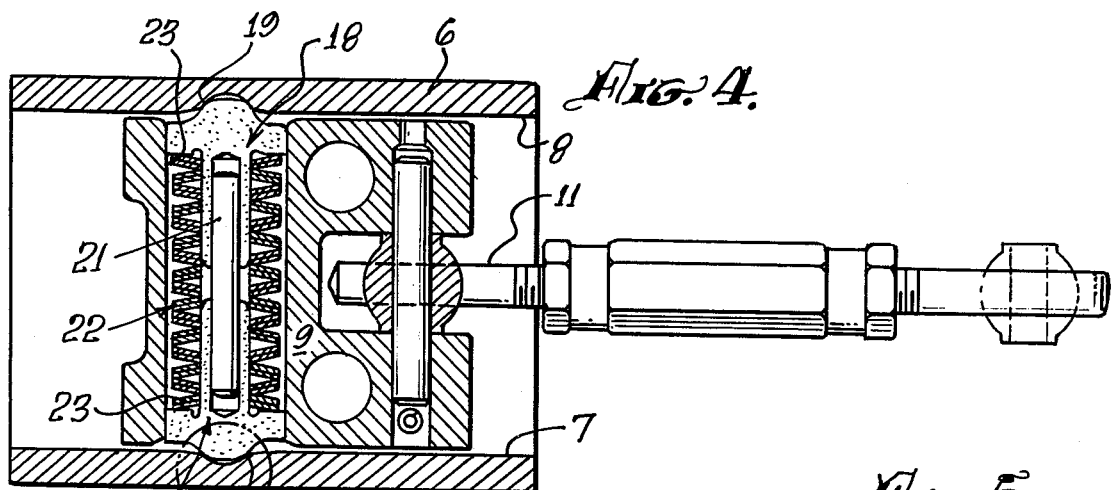
FIG. 4 is a section on lines 4—4 of FIG. 2.

The link assembly of the present invention is designated by the numeral 1. As shown in FIGS. 1 and 2, it supports an electronic package housing or casing 2 within a shell or airframe 3 of a guided missile such as the well-known Cruise missile for which the breakaway link has been specially developed. The purpose of the link is to rigidly maintain a precisely-aligned relationship between the housing 2 and the missile shell. The alignment is essential for reliable operation of the electronics which, for example, may be navigational equipment such as a missile guidance set. As will be appreciated, the alignment must be rigidly maintained during operational or flight conditions and, consequently, the link then must provide a stiff, unyielding support. Under other, non-operational conditions, some yielding of the support can be tolerated such as may temporarily disturb the desired alignment. Prior to flight, however, alignment must be reestablished and, as will be explained, this realignment presently is automatically achieved. Further, in view of the operational rigidity of the link assembly, there is a need to provide a breakaway capability effective in the event the missile is subjected to extreme load forces such as would damage the electronics. For example, missiles carried by a submarine may be subjected to extreme shock loads from near misses. Forces of 200g or more then can be generated. By way of comparison, 'g' forces under flight or operational conditions may be about 7g while other non-operational forces resulting from handling, transportation etc. may be from 10–15g. These figures, of course, are provided primarily for illustrative and descriptive purposes.

FIG. 3 shows one form of the present link assemblage. In general, it includes what will be referred to as a cross-head guide 6 formed with opposing, dove-tailed tracks 7 and 8 slidably receiving a cross-head block 9 that is pivotally secured to a link arm 11 by a mono-ball arrangement 12 better shown in FIG. 4. The outer end of link arm 11 is pivotally carried by a clevis 13 (FIG. 1) secured to missile shell 3. Special shock absorbers 14 mounted in close proximity to the link assemblies (FIG. 1) fill the space between missile shell and equipment housing 2. The absorbers are doughnut shaped members encircling the housing and formed of a resiliently-compressible, rubber-like material capable of absorbing heavy shocks applied to missile shell 3. The shocks, of course, must be capable of compressing sufficiently to absorb heavy load forces. Following the shock, they resiliently regain their initial dimensions to realign the housing 2 in a manner that will be described.

Initial alignment of housing 2 can be achieved in any desired manner. As presently contemplated, it is achieved by forming link arm 11 as a turnbuckle. Adjustment of the turnbuckle lengthens or shortens the link arm to vary the position of housing 2. The correct alignment can be determined optically. As shown, the assembly includes three spaced link assemblies permitting circumferential adjustments.

A primary purpose of the cross-head guide and block assembly is to rigidly maintain the alignment or spacing of housing 2. For this purpose, guide block 9 is locked to the cross-head guide in such a manner that it is capable of maintaining its locked position under normal operational loads. Specifically, the lock is provided by a plunger assembly which includes a pair of pistons 16 and 17 (FIG. 4) each having a shaped head portion 18 engaged in identical detents 19 formed in the side walls of tracks 7 and 8. The pistons ride or reciprocate on a central, axial pin 21 which stiffly maintains the axial alignment of the pistons during their reciprocations. To forceably urge the pistons axially outwardly into detents 19, a spring mechanism 22 is mounted between the pistons bearing against radial flanges 23 of their head portions.

Figure 6:
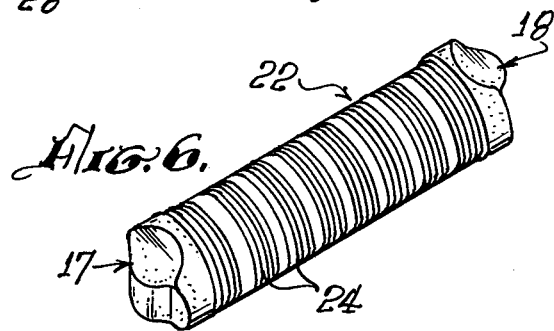
FIG. 6 illustrates a particular spring arrangement used in the present link assembly.

In a preferred form, spring mechanism 22 is provided by a number of stacked Belleville spring washers 24 (FIG. 6). Belleville springs are well-known, commercially-available items produced by Bearing Engineering Inc. of Los Angeles. Their use is particularly advantageous when high spring rates must be developed for short piston strokes. For example, in the Cruise missile application, the space provided between outer shell 3 and housing 2 is extremely small in order of about 2 inches. The overall length of the spring mechanism therefore is very limited and its movement under extreme shock conditions is very short. Specifically, the maximum stroke of each of the contemplated pistons of the present assembly is about 0.09 inches so that the two pistons together have a total stroke of 0.18 inches. The spring therefore must have an extremely high spring rate for a relatively short stroke. In other arrangements in which the space is not as confined, it may be that conventional spring arrangements might suffice. In the illustrated assembly, 32 Belleville spring washers provide the necessary force. These washers are conical-shaped members stacked on the pistons to urge the piston heads forcefully into the detents. A further advantage of the Belleville spring arrangement is that it is capable of being shimmed to any desired force. In practice, the arrangement is shimmed to provide a pre-loading force which securely holds the heads in the detents.

Figure 5:
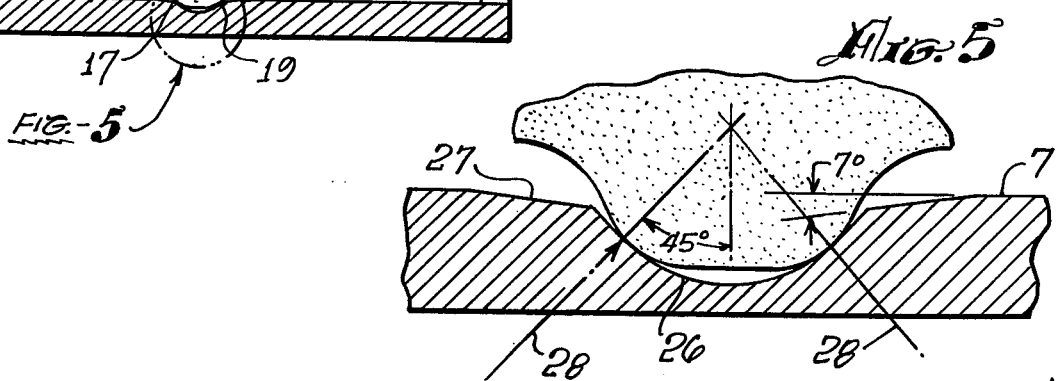
FIG. 5 is an enlarged view of the circled portion of FIG. 4.

A further feature of the invention is that the detents and piston heads are formed with a special geometry or curvature which assures the desired initial rigidity and subsequent breakaway capability. Thus, each detent is formed with a central, relatively steep-walled ramp section 26 (FIG. 5) and with an outer or peripheral, relatively shallow angle ramp section 27. In the preferred form, the steep-walled is about 45° while the peripheral ramp leading into the central portion is 7°. Further, the shaped end portions of the pistons which are received in the detents are formed so that, when seated in the 45° ramp, they have a linear engagement with the surface of the detent rather than flushly engaging the entire curvature. This linear engagement is illustrated by arrows 28 in FIG. 5. As the piston rides up the ramp in one direction or the other, the linear engagement is maintained. One purpose of the linear engagement is to avoid undesired rotation of the pistons during any displacement from their seated position onto the 7° ramp and further onto the flat walls of dove-tail tracks 7 or 8.

The operation of the present link best can be understood by considering its performance under anticipated acceleration forces or loads. Thus, under operational loads, such as a missile flight, the cross-head block is rigidly locked by the detent engagement, the link itself is rigid and the spaced disposition of the electronic equipment is stiffly maintained. To assure the locked engagement, the Belleville springs are pre-loaded. The loading prevents any displacement of the cross-head block due to spring compression when external forces up to about 7g are exerted on the block through the link arm. Obviously, loads applied to the cross-head block are reacted at the linear interface between the pistons 17 and 18 and the detent profiles. In addition to the reaction force, a component axial force is induced on the piston spring system which is balanced or compensated by an equal force on the opposite side. However, the applied forces are reacted by the pre-load forces to maintain the seated and locked position of the block.

As loading forces on the link arm are increased, the piston/spring system compresses. The cross-head block then moves relative to the guide as the piston head slides up the 45° ramp profile. When the piston head linear contact interface reaches the intersection of the 45° ramp and the 7° ramp, the reactive component force in the axial direction of the link drops off substantially and the remainder of the link stroke then takes place with relatively little resistance.

System calibration is such that increased load forces of perhaps 10–15g compress the piston spring arrangement sufficiently to permit the pistons to move onto the 7° ramp. Such 'g' forces may occur during handling or transportation of the missiles. During these events there is no need to maintain absolute rigidity. However, when the force is removed, the arrangement accomplishes a realignment in which the pistons re-seat. The re-seating operation, as should be apparent, is aided by the pre-loading of the spring as well as by the inclination of the 7° ramp. Also, shock absorbers 4, which, for example, may have been compressed by the forces, resiliently expand to realign the electronic equipment housing and to exert a re-seating force on the pistons. Under relatively low acceleration forces such as occur during handling etc., there is only a slight displacement of the cross-head block. The system remains somewhat rigid. Absolute rigidity is not required since the low level forces are insufficient to cause damage.

The need for protection of the electronic equipment arises when excessive forces are applied. For example, if the missiles are stored in a submarine, a near miss will produce a force of about 200g. Any transmission of such a force through a rigid linkage will produce serious damage. Consequently, rigidity must be broken or, in other words, the cross-head block permitted to move sufficiently to permit the applied force to be cushioned entirely by shock absorbers 14. Such a 'breakaway' presently is permitted when the cross-head guide rides outwardly of the detent and onto the flat wall portions of the cross-head guide track. Again, however, when the excessive shock loads are removed, the cross-head block automatically is returned to its seated disposition and alignment of housing 2 is regained. The resiliency of the shock absorbers coupled with the pre-loaded condition of the spring again are capable of achieving the re-seating and realignment. Re-seating also is promoted by the fact that the cross-head block first returns to the 7° ramp. The incline of this ramp tends to cause the pistons to ride back toward the central 45° ramp.

Figure 9:
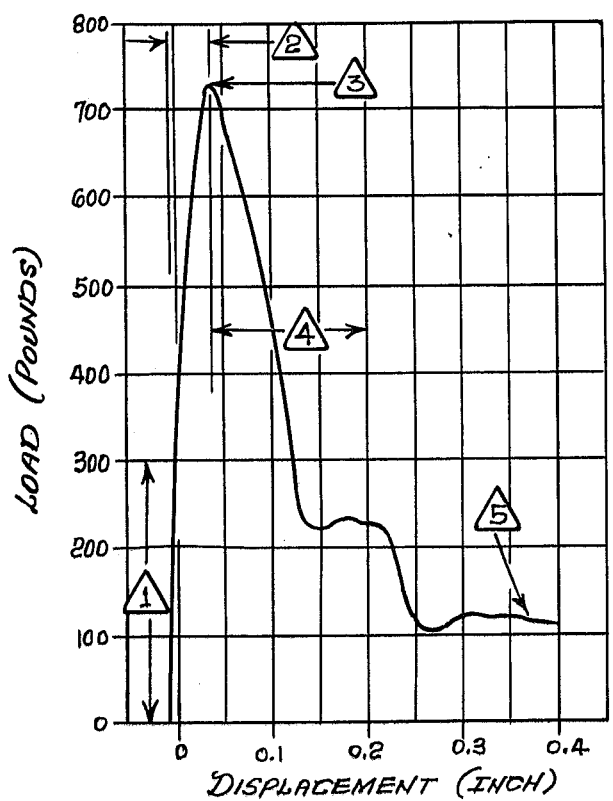
FIG. 9 is a load-deflection curve illustrating the manner in which the assembly operates.

FIG. 9 illustrates the operation of the link assembly in terms of a load-deflection curve derived from an actual link calibration test. In these tests, the assembly was calibrated to have a pre-load equal to about 300 pounds with a spring compression of about 0.050. The cross-head block then was moved in the guide ±0.50 inch and the load curve recorded. Referring to FIG. 9 it is seen that △ is a pre-load zone in which there is a high stiffness capable of withstanding such loads as may be anticipated during flight maneuvering and vibration. There is minimal displacement up to loads of about 300 pounds. Zone △ illustrates the piston travel on the 45° profiled ramp. During this travel, it will be noted that there is a very slight displacement responsive to loads up to about 740 pounds. Zone △ represents a breakaway load equivalent to approximately 13g acceleration with the piston initiating travel on the 7° profile ramp. Zone △ shows the displacement as the piston is traveling on the 7° ramp. Finally, in zone △ the piston friction force is on the flat portion of the tracks beyond the 7° ramp. It will be appreciated that the test results are applicable only to a particular configuration and a particular calibration. They do, however, illustrate the fact that rigidity is maintained during operational loads and that, upon breakaway, the loads are drastically reduced to enable protection by the shocks.

Figure 7:
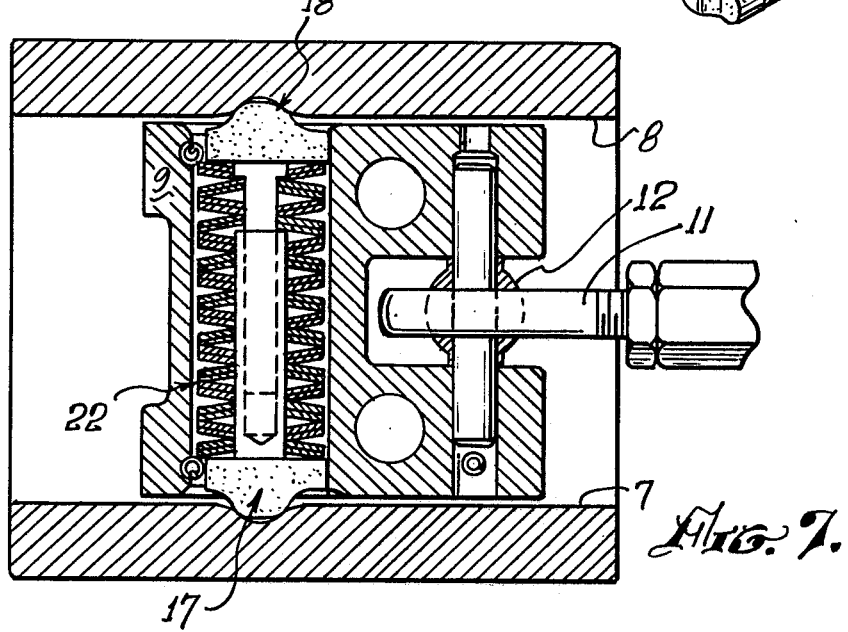
FIGS. 7 and 8 are views similar to FIG. 4 showing modified forms of the invention.
Figure 8:
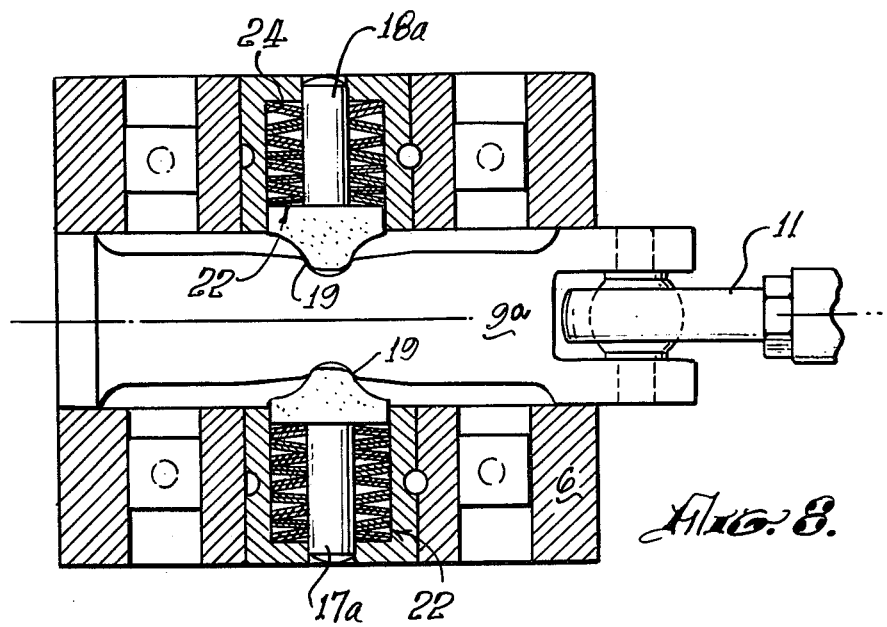

FIGS. 7 and 8 illustrate modifications of the FIG. 4 piston/spring arrangement. Thus, in FIG. 7, pistons 17 and 18, instead of being mounted on an axial pin, are telescoped together. Operationally, this rearrangement behaves the same as the FIG. 4 form, i.e. the load-deflection curve of FIG. 9 applies.

FIG. 8 is a rearrangement in which the piston/spring arrangements are carried by cross-head guide 6 with the detents being formed in a shaped guide block 9a. As shown, two separate pistons 17a and 18a are used each having its own stack of Belleville spring washers 24 seated in appropriate counterbores in the block to bear against the piston heads. This arrangement perhaps is simpler to machine and, consequently, more economical. Again, however, it is capable of functioning in precisely the manner demonstrated by FIG. 9, i.e. load-deflection curves for FIG. 8 correspond to FIG. 9. This, of course, is true only under like conditions in which the FIG. 9 detents are shaped with the 45° and 7° ramps of FIG. 4 and the linear contact of the piston heads in the detents is the same. In other words, the FIG. 5 head/detent geometry applies to the FIG. 8 modification.

The operation of the present breakaway link has been described and the basic advantages should be rather apparent. One particular advantage which perhaps merits special attention is that a breakaway link is provided which can provide the rigidity and the breakaway capabilities in extremely small 'sway' spaces, i.e. the available sway space between outer shell 3 and inner housing 2. As stated, available sway space in the contemplated use amounts to only 1.9" or less. In this regard, the use of the Belleville springs is an important factor because of its high spring rate for short strokes. Other significant features include the ramp geometry which provides the load-deflection curve and also promotes realignment. Obviously, however, other geometries may apply under differing circumstances. Another significant factor is the use of the shock absorbers to realign the structural parts and reseat the particular link that has been disclosed.

In conclusion, it should be recognized that there is no intent to limit the present invention to the particular geometries and configurations that have been discussed. For example, although the discussion has been with reference to a cylindrical housing 2 concentrically spaced in a cylindrical shell 3, the principles of the invention are equally applicable to other structures such as a pair of spaced planular or flat plates as contrasted with the cylindrical illustrated cylindrical members.

Obviously many modifications and variations of the present invention are possible in the light of the above teachings. It is therefore to be understood that within the scope of the appended claims the invention may be practiced otherwise than as specifically described.

We claim:

1. A breakaway link assembly adapted to be coupled between spaced outer and inner structural members for rigidly maintaining said spacing under low level accelerating forces and for protectively yielding its rigid structural support when subjected to higher level forces comprising:
    a crosshead guide member adapted to be secured to said inner structural member and formed with a longitudinally-extending guide track having a flat-walled portion,
    a crosshead block member slidably mounted in said track,
    plunger latch-like means transversely-carried by one of said crosshead members with a plunger-engaging detent means being formed in the other,
    a link arm for pivotally coupling said outer structural member to said crosshead block member, and
    pre-loaded resilient means holding said latch-like plunger means in a centrally-seated position in said detent means with a force sufficient to maintain said position under said low level structure accelerating loads whereby said structural member spacing is rigidly maintained,
    said detent means being formed with a centrally-located relatively steep-walled central ramp section and peripherally with a relatively shallow ramp section; said higher level acceleration forces being sufficient to overcome said resilient pre-load force and permit a guide block displacement in which said latching plunger can ride up said ramps and onto said flat-walled track portion for breaking said rigid link support and preventing direct transmission of said accelerating forces from one structural member to another.

2. The assembly of claim 1 wherein said resilient means is a preloaded spring means bearing on said plunder means for compressibly seating said plunger means in said detent means with sufficient force to maintain said rigidity when subjected to said low level forces; the stiffness of said spring means being coordinated with the angular profile of said ramp to confine said displacements of the guide block member within the periphery of the detent means when subjected to normally-occuring higher level acceleration forces and to permit said breakaway displacements at the upper level of said normally-occuring higher force range, said preloaded spring compression being capable of returning said guide block member to its seated disposition following said displacements.

3. The assembly of claim 2 wherein said assembly includes said inner and outer structural members and further includes:

resilient shock absorber means operatively disposed between said outer and inner members for absorbing accelerating forces when said rigid link support is broken.

4. The assembly of claim 3 wherein, following said breakaway displacements, said shock absorber means is formed to realign said outer and inner members in said initially spaced disposition, said realignment causing said guide block member to return to its sealed and latched position relative to said detent means.

5. The assembly of claim 4 wherein said link arm includes turnbuckle means for varying the arm length whereby said initial spaced disposition of said inner and outer structural members can be adjusted.

6. The assembly of claim 2 wherein said plunger means includes: a piston having a head portion shaped to seat in its centrally-located detent ramp section; the curvature of said head portion and said ramp section being such that said head section engages said ramp section in a line contact.

7. The assembly of claim 6 wherein said centrally-located ramp section is shaped to provide about a 45° ramp for said piston, said 45° ramp leading into a peripheral ramp section of about 7°.

8. The assembly of claim 2 wherein said spring means is provided by a stacked plurality of Belleville-type spring washers.

9. The assembly of claim 2 wherein said guide track of said guide member is formed of a pair of laterally-spaced flat-walled tracks having laterally-aligned detent means, said plunger means being carried by said guide block member and including a pair of pistons mounted for independantly-reciprocably expansion and contraction movements in opposite lateral directions relative to said block member, said pistons each having an arcuate head portion shaped to seat in said steep-walled ramp section with said spring means expandably urging said pistons into said seated dispositions.

10. The assembly of claim 9 wherein said spring means is common to both pistons whereby a force exerted in one direction on one piston is translated by said spring means into an equal and oppositely directed force on the other.

11. The assembly of claim 10 wherein said spring means is provided by a stacked plurality of Belleville-type spring washers.

12. The assembly of claim 2 wherein:

said plunger means includes a pair of independant piston-like plungers mounted in diametrically-opposed positions in said crosshead guide member, and said spring means includes an independant resilient spring for each plunger, said detents being formed in said crosshead block member and said plungers into said centrally-seated position in said detents.

13. The assembly of claim 12 wherein said springs each are formed of a stacked plurality of Belleville-type spring washers.

* * * * *